2,220,403
Patented Nov. 30, 1965

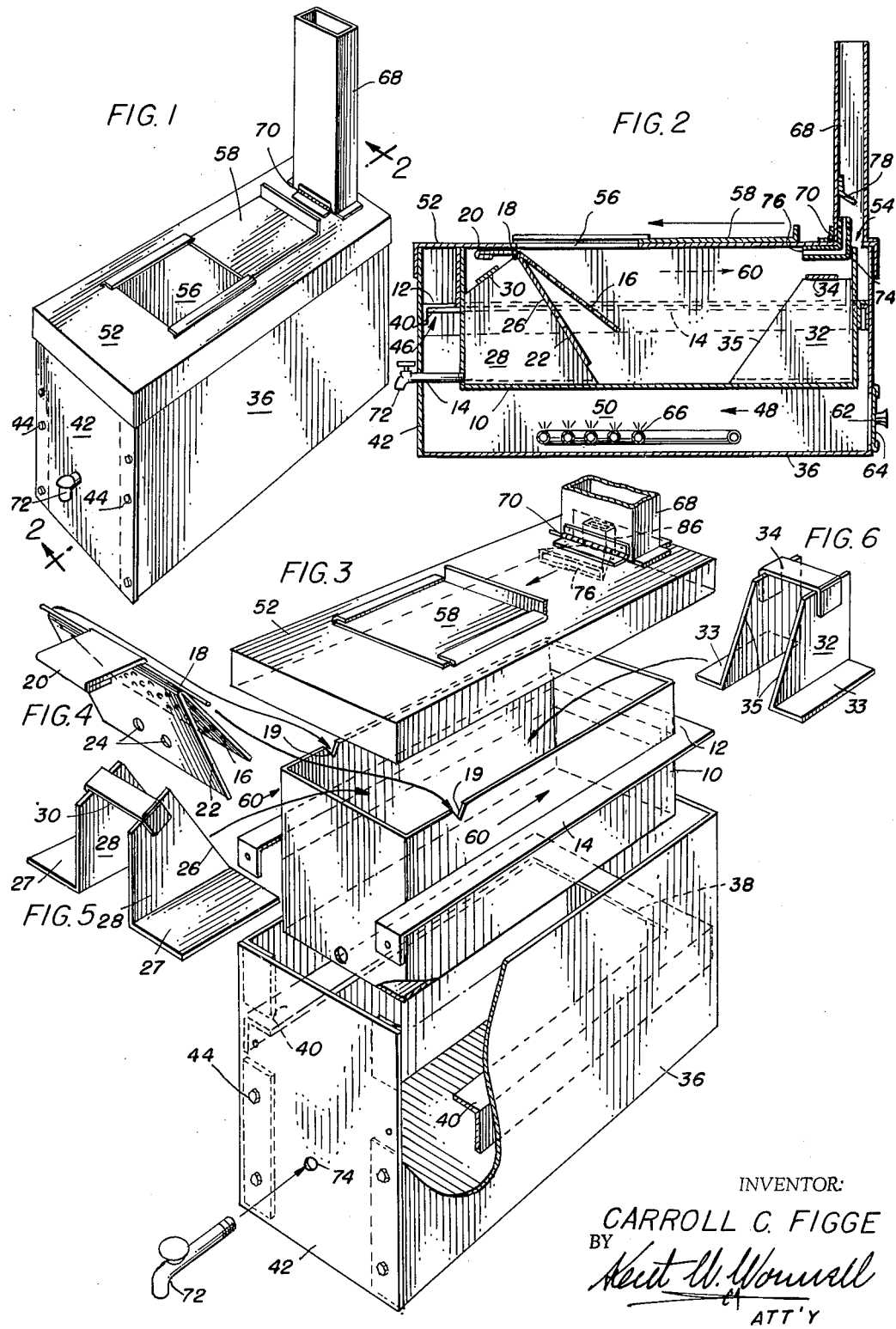

3,220,403
TUBELESS HEATING KETTLE
Carroll C. Figge, 1244 Batavia Ave., Batavia, Ill.
Filed Mar. 19, 1964, Ser. No. 353,188
1 Claim. (Cl. 126—343.5)

This invention relates to a receptacle for heating various materials, but is more particularly described as a tubeless and jacketed heater for kettles adapted to contain bituminous materials for roofing. In this particular capacity, it may contain or receive solid sections or blocks of material which may remain in that condition until they are heated and assume a liquid condition in which the material may be withdrawn from a kettle and used upon a roof, for example, or in any other place in which the particular material is applicable.

This invention relates to a jacketed receptacle or kettle with passages surrounding the receptacle with a conventional shell and heat movable in opposite directions in the passages from one end to the other of the jacket, and a stack or flue located at the same end in which a burner is inserted in a conventional manner.

Other features of the invention are to provide means for bodily withdrawing the receptacle or kettle from its shell or jacket; to form horizontal or jacket passages in the shell by slidably and removably mounting the kettle upon a horizontal ledge projecting from it and corresponding with a similar ledge intermediate the top and bottom of the shell; to provide a common cover for the kettle and shell at one end of which the stack may be mounted; to provide a draw-off from one end of the kettle extending through a space between the kettle and its shell, and projecting outwardly beyond the shell at the end opposite the stack and the heater; to provide a removable or opening lid which covers a portion of the kettle and provides an opening for inserting lumps or quantities of material in the kettle; to provide at the end of the kettle opposite the heater an inclining separator for liquid material adjacent the draw-off cock with a weighted or spring pressed platform located below the ordinary opening in the cover, which is closed by a separate lid; the platform being pivoted at the top of the inclined separators for discharging lumps or materials placed thereon into an intermediate portion of the kettle; to provide means in the kettle adjacent the heater consisting of upright plates for separating solidified material and for transferring heat directly from the heater at that end to assist in disseminating heat throughout the solid mass and also in conveying heat to the material at this end of the kettle when in a more liquid condition; in providing means for guiding lumps of inserted material toward a mid-portion of the kettle; to provide means for withdrawing vapors and gases from the upper portion of the kettle and the shell into the stack; and in general to produce a more effective and efficient heating and melting kettle for reducing solid lumps or portions of a material to a liquid state by the application of heat to a jacketed tubeless container surrounding a kettle receptacle within the shell.

Other objects of the invention will appear in the specification and will be apparent from the accompanying drawings, in which, FIG. 1 is a perspective view of a tubeless heating kettle, in accordance with this invention; FIG. 2 is a longitudinal sectional view on the line 2—2 of FIG. 1; FIG. 3 is an exploded composite perspective view of the kettle with some parts shown in section; FIG. 4 is a detail perspective view of the counterweighted receiving platform; FIG. 5 is a perspective view of the weighted draw-off valve closer; and FIG. 6 is a perspective view of the directing, separating, and heating plates at the adajcent end of the kettle.

This invention is more particularly described as a safety tubeless kettle and heater for receiving lumps or other solid material which is melted by the application of heat and is withdrawn in liquid form, such as the application of bituminous material to a roof, or for a roofing operation, although the apparatus may be used for a similar reduction and treatment of other material for different purposes.

Referring now more particularly to the drawings, an inner kettle 10 preferably in the form of a rectangular receptacle open at the top is formed with an outwardly projecting end flange 12 and side flanges 14 several inches in width, substantially in line with each other, and projecting from the outer end and sides of the receptacle about midway of its height.

The top of this kettle receptacle 10 is preferably open and near one end is a platform 16 preferably mounted on a rod 18 near the upper end of the platform at its ends in V-notches 19 in the opposite upper edges of the receptacle near one end thereof. This platform has a weight 20 at the side opposite the pivot rod for holding it at the top of the receptacle with a space at the weighted end for allowing the weight to move downwardly, or to substitute an equivalent spring for normally holding the platform in its upper position.

Below this platform is an inclined plate 22 extending from near the pivot rod 18 nearly to the bottom of the receptacle and limiting the downward movement of the platform. This plate may have openings 24 or may be made of foraminous material upheld in the angular position by two parallel plates 28 extending upwardly on bottom angular flanges 27, each having an inclined or angular front edge 26 extending to the bottom surface of the kettle 10. These plates 26 are joined at the top or held spaced apart by a connecter 30, but these connected parts, including the angular plates 28, are loose in the end of the kettle receptacle and freely removed therefrom when the contents of the kettle is liquid, or empty for cleaning and repair. These plates 28 are also parallel with and spaced from the sides of the rectangular kettle by the flanges 27, extending upward from the bottom and provide means for transfusing the heat from the bottom of the receptacle upwardly through the mass of material whether it be solid or liquid. The plate connector 30 spaces the plates 28 apart and is bodily removable from the receptacle after the platform 16 is removed.

The upper side of the platform 16 and the plate 22 both tend to direct inserted material into the mid-portion of the kettle. At the other end of the kettle 10, directly over a heater position near the end flange 12, are plates 32 extending parallel with each other, spaced apart, and parallel with the sides of the receptacle. The plates have flat tops joined by a top plate 34 for connecting them together with outwardly extended flanges 33 for loosely spacing and seating them at the bottom and making them bodily removable but tightly insertable against this end of the receptacle and the bottom thereof.

Inner edges 35 of the plates 32 are inclined from the top widening at the bottom to provide heat transference in the receptacle for more quickly liquifying solid matter, such as bituminous material which may be set between these plates 32 when the material is cold, and before it is heated to liquid form. Thus the inclined edges 35 of the plates 32, the outer surface of the platform 16 when depressed, and the outer surface of the inclined plate 22 all tend to centralize any bituminous material placed upon the platform 16 and allowed to sink, or any material which is dumped into the kettle.

This kettle receptacle 10 is designed and intended to be enclosed in a shell 36 slightly longer and wider than the kettle and having inwardly extending flanges 38 at one end and 40 at adjacent sides thereof at a distance from the top to underlap and support corresponding side flanges 14 and end flange 12 of the kettle, for supporting the kettle therein at a distance below the bottom of the shell, and substantially flush at the tops thereof.

To permit the kettle receptacle 10 to be inserted in the shell 36, one end 42 of the shell is made removable by making it separate and providing bolts 44 for attaching the end to the corresponding ends of the shell. At this end of the shell, there is no end flange similar to the end flange 38 at the other end, but the end of the receptacle is spaced from the corresponding end of the shell 36 thus connecting the kettle flues below and above flanges 14 and 40. By omitting or taking off the end 42 of the shell, the kettle receptacle may be inserted therein, with the side flanges 14 resting upon the side flanges 40 of the shell (and the end flange 12 of the receptacle combining with the end flange 38 of the shell to close the space at this end of the shell) leaving an upward passageway 46 at the other end of the shell communicating with a space 48 surrounding the kettle below the flanges 14 and 40 and forming a lower passageway, the entire bottom below the kettle 10 being spaced above the bottom formed by the lower edge of the shell 36 and constituting the heater space 50.

A top plate 52 is applied to the upper edge of the shell to fit it closely and to substantially engage the upper edge of the kettle receptacle 10. This top plate preferably has a downwardly extending flange on the four sides with a stack opening 54 at one end and a material opening 56 intermediate the ends but nearer the other end. This opening 56 has a cover 58 which is hinged or slidably attached to the top plate 52 and is movable over and to close the material opening 56 except to charge the kettle with material, to leave it open for cooling, or to facilitate access thereto.

This top plate, together with the upward passage 46 forms upper passageways 60 extending from the passage 46 to the stack opening 54 and completes a lower draft passage at the bottom of and surrounding the receptacle to the upward passage 46 from a draft opening 62 at the other end of the shell 36. A door 64 closes the opening 62 and a conventional gas or other heater 66 forms a part of the shell 36 or is inserted in the heater space 50, the flames directly engaging the bottom of the kettle at that end in which the plates 32 are inserted, applying the initial heat to this portion of the kettle in which the material may be solid and disseminating the heat by means of plates 32 and 22 as previously set forth.

Thus a complete draft passage is provided from the heater including the sides and bottom of the kettle, partly surrounded by the shell 36 to the opposite end of the shell where the heat moves upwardly through the passage 46 and thence reverses in direction on the kettle, through the passageway 60 to the other end of the shell, through the stack opening 54, and upwardly through a stack 68. This stack may be securely attached to the sides of the stack opening 54 of the top plate or for convenience may have a hinge 70 at the inner side thereof, to lie downwardly over the top plate for compactly disposing of the stack, when it is not in use.

After the end 42 of the shell is secured in place, the kettle receptacle 10 will be spaced approximately the width of the passage 46 therefrom and a draw-off cock 72 may be applied to the end of the kettle 10 above the bottom thereof through an opening 74 in the shell. The opening for this cock is below and relatively under the inclined plate 22 where hot and liquid material will collect, and slightly above the bottom of the receptacle to avoid dregs or foreign matter which may be close to the bottom of the kettle.

Secured to the lower end of the stack 68 adjacent the hinge 70 is one angular end of a vaporizer 74 which has another angularly extending end with a widening opening 76 extending just below the top plate 52 when the stack is raised. This opening faces away from the stack 68, is in the upper portions of the kettle and the shell, and receives smoke, odors, condensation, and other fumes and vapors which are drawn through the inspirator or vaporizer 74, and upwardly and outwardly by the draft induced in the stack.

When the stack 68 is folded downwardly on its hinge 70, the vaporizer 74 moves with it relative to the top plate 52, the wider end swinging freely and being spaced therefrom.

A deflector plate 78 is secured to the stack 68 and spaced from the open or upper end of the vaporizer 74, to protect it from water and other material which may fall in the stack when it is raised, but allowing free passage of fumes and vapors therefrom.

With this construction, it is apparent that the heating kettle is free from tubes extending from the heater through the mass of material to be melted, and a maximum heat of melting is obtained by applying it directly to the bottom and sides of the kettle in a somewhat tortuous and lengthy path to the stack; that the heat is disseminated in the kettle by means of the plates 28 and 32 resulting in a more rapid melting of the material; that the material itself may be fed in lumps or masses into the kettle through the feeding opening and instead of passing directly to the hottest or more liquid portions of the kettle, they will be directed to a central portion thereof, without splashing of the material due to dropping it into a hot kettle; that the melted material may be withdrawn from a hot end of the kettle; and that any dangerous fumes will be automatically withdrawn from the kettle and discharged from the stack with other products of combustion.

While a preferred form of the invention has been shown and described in some detail, other changes in the construction, combination and arrangement of the parts may be made without departing from the spirit and scope of the invention.

I claim:

In a tubeless heating kettle, a rectangular receptacle open at the top for receiving and containing material to be heated having flanges extending outwardly at opposite sides and one connecting end intermediate the top and bottom thereof, the other ends of the side flanges extending beyond the receptacle a distance equal to the width of the end flange; an enclosing shell open at the top fitting loosely below and around the receptacle with opposite side flanges and one end flange corresponding to those of the receptacle intermediate the top and bottom of the shell for supporting the receptacle upon its flanges therein thereby forming upper and lower passageways closed by the side and end flanges but having a connecting opening between them at the said other ends, making the passages continuous but extending in opposite directions, means for connecting the said extending ends of the receptacle side flanges to the adjacent end of the shell and thereby maintaining the receptacle and shell together in spaced relation, the lower passageway extending below the flanges and in the lower end of the shell with a heater space and inlet through the end of the shell at the closed end of said passageway, a cover for the upper open end of the receptacle and the upper open end of the shell closing the upper passageway with a stack opening at the closed end of the passageway, a material filling opening and closure in the cover as wide as the receptacle, means within the receptacle comprising a counterweighted and pivoted platform mounted in opposite sides of the receptacle and swinging downwardly for receiving and cushioning material to be heated which is entered through said opening, and heat diffusing removable parallel plates resting in the receptacle below said platform with inclined edge surfaces to engage the said platfrom and limit its downward movement when material to be heated is deposited thereon.

(References on following page)

References Cited by the Examiner

UNITED STATES PATENTS

| | | | |
|---|---|---|---|
| 2,041,359 | 5/1936 | Littleford | 126—343.5 |
| 2,076,689 | 4/1937 | Williams | 126—343.5 |
| 2,396,748 | 3/1946 | Pitman | 126—343.5 |
| 2,728,336 | 12/1955 | Elgeti | 126—343.5 |
| 3,046,977 | 7/1962 | Figge | 126—343.3 |

FOREIGN PATENTS

| | | |
|---|---|---|
| 359,941 | 10/1931 | Great Britain. |
| 458,785 | 12/1936 | Great Britain. |

FREDERICK L. MATTESON, Jr., *Primary Examiner.*

CHARLES J. MYHRE, *Assistant Examiner.*